(12) United States Patent
Meyer

(10) Patent No.: US 6,292,229 B1
(45) Date of Patent: Sep. 18, 2001

(54) VIDEO SIGNAL TIMING IN A MULTI-FORMAT ENVIRONMENT

(75) Inventor: Charles S Meyer, Nevada City, CA (US)

(73) Assignee: Nvision, Inc., Grass Valley, CA (US)

( * ) Notice: Subject to any disclaimer, the term of this patent is extended or adjusted under 35 U.S.C. 154(b) by 0 days.

(21) Appl. No.: 09/270,632

(22) Filed: Mar. 17, 1999

(51) Int. Cl.[7] .................................................. H04N 5/268
(52) U.S. Cl. ........................................ 348/705; 348/722
(58) Field of Search ..................................... 348/705, 706, 348/722, 500, 578, 180

(56) References Cited

U.S. PATENT DOCUMENTS

| | | | |
|---|---|---|---|
| 4,532,547 | * 7/1985 | Bennett | 358/148 |
| 4,743,958 | * 5/1988 | Bannister | 358/11 |
| 5,227,863 | * 7/1993 | Bilbrey et al. | 358/22 |
| 5,241,389 | * 8/1993 | Bilbrey | 358/181 |
| 5,872,565 | * 2/1999 | Greaves et al. | 345/328 |

* cited by examiner

Primary Examiner—Victor R. Kostak
(74) Attorney, Agent, or Firm—Merchant & Gould P.C.

(57) ABSTRACT

In a video broadcast or production plant including first and second video sources which provide first and second digital video signals respectively at integer related frame rates, the video sources are operated so that the first and second video signals are aligned at a reference time. Switch points for updating a router in the plant are defined by measuring lapse of time from the reference time.

16 Claims, 3 Drawing Sheets

VIDEO SIGNAL TIMING IN A MULTI-FORMAT ENVIRONMENT

BACKGROUND OF THE INVENTION

This invention relates to video signal timing in a multi-format environment.

Until quite recently, the rules of the United States Federal Communications Commission (FCC) required that video material should be broadcast using the NTSC signal format. The NTSC video format is an interlaced format, in which each frame is composed of two fields. The frame rate of the NTSC video format is 30/M frames/sec where M is a data rate divisor and is equal to 1.001.

In a television broadcast facility, several video signal sources, each generating a signal in NTSC format, are connected to respective inputs of a router, which supplies the video signals to selected video signal destinations. The various signal sources are controlled by a common timing signal so that they are in phase.

definition (SD) NTSC format. One way for a broadcaster to meet this requirement would be to generate the video material for broadcast in the HD domain and, concurrently with broadcast of the HD material, convert the HD material to SD and broadcast the SD material. An alternative, which may be attractive for some purposes, would be to receive the source material in both formats, process the SD material in an SD path to generate the SD broadcast stream and concurrently process the HD material in a separate, parallel HD path to generate the HD broadcast stream, and broadcast the SD material and the HD material simultaneously.

Although the SD video signals that are currently broadcast are analog formats, the HD signals are in digital format and almost all of the processing of SD and HD video signals is conducted in the digital domain.

At least thirteen digital HD signal formats, designated by SMPTE 292M Format ID's A–M, have been defined for HD video signals. Several of the format parameters for these digital high definition video signals are listed in Table I.

TABLE I

| Reference SMPTE Standard | 260 M | | 295 M | 274 M | | | | | | | | 296 M | |
|---|---|---|---|---|---|---|---|---|---|---|---|---|---|
| Format ID | A | B | C | D | E | F | G | H | I | J | K | L | M |
| Lines per frame | 1125 | 1125 | 1250 | 1125 | 1125 | 1125 | 1125 | 1125 | 1125 | 1125 | 1125 | 750 | 750 |
| Total active lines | 1035 | 1035 | 1080 | 1080 | 1080 | 1080 | 1080 | 1080 | 1080 | 1080 | 1080 | 720 | 720 |
| Frame rate (Hz) | 30 | 30/M | 25 | 30 | 30/M | 25 | 30 | 30/M | 25 | 24 | 24/M | 60 | 60/M |
| Fields per frame | 2 | 2 | 2 | 2 | 2 | 2 | 1 | 1 | 1 | 1 | 1 | 1 | 1 |

The router is composed of multiple input buses, connected to the sources respectively, multiple output buses, connected to the destinations respectively, and an array of crosspoint switches that are operable selectively for connecting any one input bus to any selected set of one or more output buses. The state of the ij th crosspoint switch is ON (it connects output bus j to input bus i) or OFF (it isolates output bus j from input bus i). The router includes a memory having an addressable location associated with each crosspoint switch. During each active interval of the video signal, the memory is addressed to store in each location the desired state of the corresponding crosspoint during the next active interval. The desired state may be the same as the current state or it may be the opposite state. During the vertical blanking interval, the contents of the memory are used to update the entire array of crosspoint switches.

In order to minimize degradation of the output signals of the router, the update is made consistently on the same line of the video signal frame. This line is referred to as the switch line, and the time at which the crosspoints are updated is referred to as the switch point. Nominally, the switch point is halfway through the switch line, but SMPTE RP-168 defines a window of +/−5 µs.

Since the NTSC video format is an interlaced format, there are two vertical blanking intervals, and hence two switch lines, per frame. In each field, the switch line is the first line of the vertical blanking interval after the equalizing pulses. The switch line is identified by continuously monitoring the video signal to find vertical sync, and counting lines until the first line after the equalizing pulses.

Current rules of the FCC allow broadcast of video material in a high definition (HD) format, but require that a television broadcaster who broadcasts video material in an HD format should broadcast the same material in standard The U.S. broadcast facilities that simultaneously broadcast HD and SD streams have each selected either format E or format M for digital HD material. Format E is a 30/M frame/sec, 1125 lines/frame interlaced format and format M is a 60/M frame/sec, 750 lines/frame progressive scan format.

For some of the digital HD signal formats, there are equivalent analog signal formats in which the blanking interval includes equalizing pulses. Depending on the format, the equalizing pulses occur in the first five or six lines of the vertical blanking interval. With respect to a digital signal format having a corresponding analog format, it has been proposed that the switch line should be the first line after the vertical blanking interval. It has also been proposed that the switch line for a digital signal format for which there is no corresponding analog format should be the same line as the switch line for the closest digital format for which there is a corresponding analog format.

In video post production, a router is used to assemble source material to produce a video stream which is supplied to a broadcast facility to include in a broadcast stream. For example, in post production several brief scenes might be assembled to form a commercial message, which the broadcaster combines with other commercial messages and program material to generate the broadcast stream. In post production, the segments of the program source material may be in different formats. It may be necessary to combine a segment of a first format with a segment of a second format and produce a program in a third format. Much of the material used in post production is based on film, which is 24 frames/sec.

SMPTE 259 specifies the structure of a serial digital interface (SDI) data stream derived from a 10-bit 4:2:2 component digital signal or a $4f_{sc}$ NTSC composite digital signal. The SDI data stream was specified in order to facilitate interconnection of equipment from different manufacturers. Each line interval of the SDI data stream has four areas: EAV (end of active video) for the previous line, blanking level or horizontal ancillary data, SAV (start of active video) and digital active line, which contains active picture or vertical ancillary data depending on the location of the line in the frame.

Similarly, SMPTE 292M specifies the structure of a serial digital interface data stream derived from 10-bit source data words for HD digital signals. Digital video data in accordance with any of the SMPTE HD formats defined in Table I can be distributed in a serial data stream in accordance with SMPTE 292M.

The serial digital interface data stream specified in SMPTE 292 does not include a word that specifies the source format, e.g. SMPTE format E or SMPTE format M, and accordingly it is not possible to determine the source format without disassembling the data stream and observing patterns in the source data. Consequently, it is not possible to determine whether there is a corresponding analog format and, if so, whether the equalizing pulses of the corresponding analog format occupy the first five lines or the first six lines of the vertical blanking interval.

SUMMARY OF THE INVENTION

The proposals that have hitherto been made regarding the switch line for HD digital video signals miss an opportunity to afford simplified timing and synchronization across a multi-format facility. Further, it will be appreciated by those skilled in the art that setting the switch point of a digital video signal by reference to equalizing pulses of an analog equivalent signal imposes restrictions on the choice of the switch point that are not related to requirements of the digital signal format.

It has been suggested in accordance with the invention that it would be desirable to switch HD video data in the SMPTE 292 domain instead of using SMPTE 292 only as an interface standard and converting the SMPTE 292 signal to Format E or M, for example, for switching. However, a barrier to implementation of this suggestion is that it is not possible to distinguish source format in the SMPTE 292 domain and therefore it is not possible to determine the proper switch point.

For the time being, it will be assumed for the sake of simplicity that the value of M is one, not 1.001. Under this assumption, the frame rate of the NTSC signal is 30 Hz and the frame rates of formats E, K and M are 30 Hz, 24 Hz and 60 Hz respectively.

It has been observed in accordance with the invention that there is a predictable and repeating sequence of time offsets between a signal having a frequency of 30 Hz (or an integer multiple of 30 Hz) and a signal at a frequency of 24, 25 or 60 Hz. Accordingly, with a master clock signal running at 30 Hz, or an integer multiple of 60 Hz, it is possible to set switch points not only for 30 frame per second material but also for 24, 25 and 60 frame material provided that the different signal sources have a known time offset, which may be zero, at an arbitrary time $t_{ref}$. In this event, the switch lines of each format occur at exactly predictable points in time in a repeating sequence that is reset every second.

In accordance with the present invention there is provided a method of operating a video router in a plant including at least first and second video sources which provide first and second digital video signals respectively at integer related frame rates, said method including operating the first and second video sources so that the first and second video signals are aligned at a reference time, and defining switch points for updating the router by measuring lapse of time from said reference time.

BRIEF DESCRIPTION OF THE DRAWINGS

For a better understanding of the invention, and to show how the same may be carried into effect, reference will now be made, by way of example, to the accompanying drawings, in which.

Detailed Description

Figure 1:
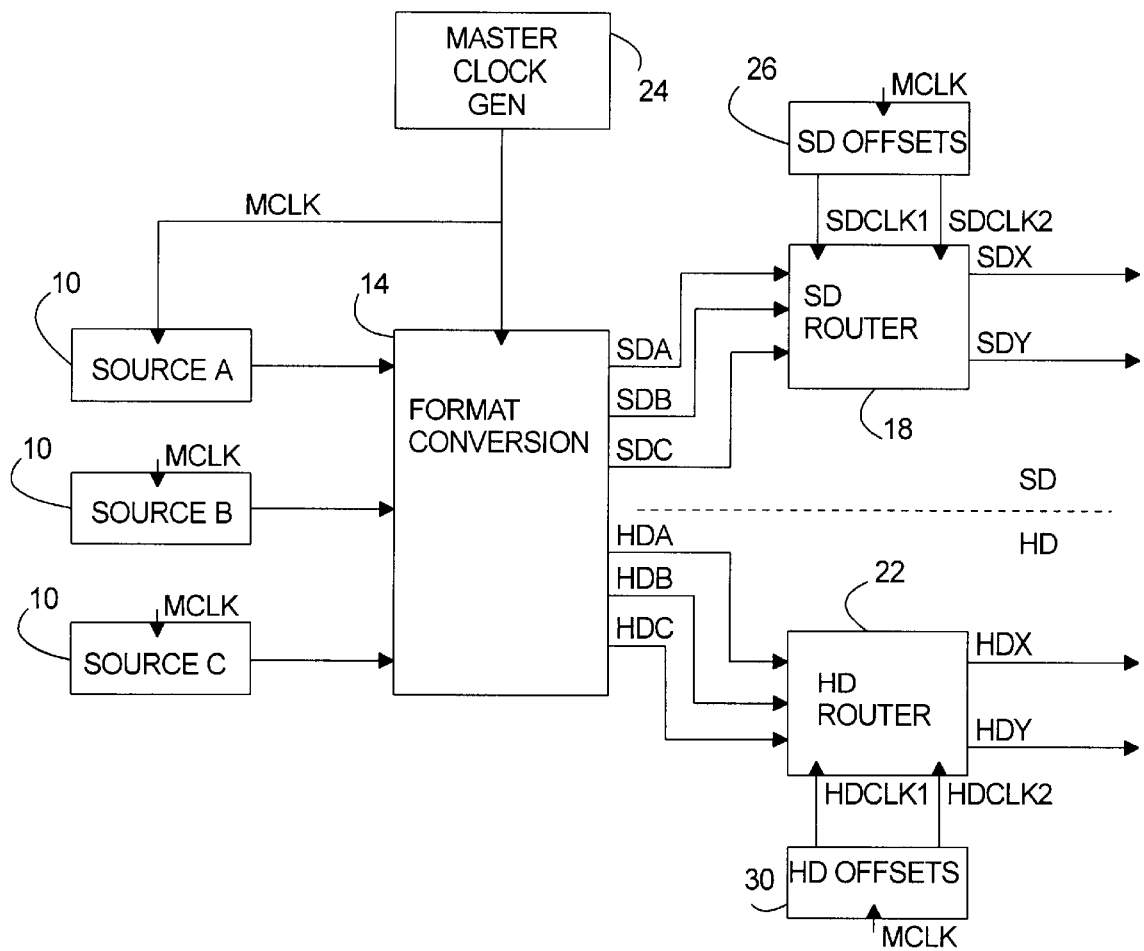
FIG. 1 is a simplified block diagram of a first television broadcast facility in accordance with the present invention.

FIG. 1 illustrates a broadcast facility including three video sources 10, designated more specifically Source A, Source B and Source C. Source A generates an SD NTSC signal whereas Sources B and C generate HD signals in the broadcaster's selected HD digital format, such as SMPTE Format E. The output signals of the sources are supplied to a format converter 14, which generates an HD signal from the SD input signal and generates SD signals from the HD input signals, and converts the SD signals to SMPTE 259 format and the HD signals to SMPTE 292 format. The SD signals are supplied to an SD router 18 and the HD signals are supplied to an HD router 22. The sources operate under control of a master clock generator 24, which generates a master clock at 60 Hz, such that at a selected time $t_0$, the start of line 1, field 1, frame 1 of the three signals, generated by the three sources respectively, are aligned. The master clock MCLK is supplied to the format converter 14 and is used to generate local clock signals for controlling the operations performed by the format converter. By using the master clock MCLK to control all operations performed by the format converter, and using delays if necessary to compensate for processing and propagation time, the output signals of the format converter are aligned at time $t_1$, where $t_1-t_0$ represents delay from the outputs of the sources 10 to the outputs of the format converter 14.

The SD router provides SD output signals SDX and SDY by switching among its input signals SDA, SDB and SDC. Similarly, the HD router 22 provides output signals HDX and HDY by switching among its input signals HDA, HDB and HDC. The video contents of the signals HDX and HDY correspond to the contents of the signals SDX and SDY respectively.

The master clock signal MCLK is also supplied to an SD offsets circuit 26, which employs delay elements and multiplexers to generate two SD router switching clock signals SDCLK1 and SDCLK2, and to an HD offsets circuit 30, which employs delay elements and multiplexers to generate two HD router switching clock signals HDCLK1 and HDCLK2. The router switching clock signals are used to control updating of the crosspoints of the two routers respectively.

The two signals SDCLK1 and SDCLK2 each have a frequency of 30 Hz but they are offset in time. The signal SDCLK1 is used to update the crosspoints of the router 18 during the blanking interval of field 1 and has an active clock edge occurring halfway through line 1 of each frame, at about $t_1+nH+31.75$ μs, where n represents frame number, and the signal SDCLK2 is used to update the crosspoints during the blanking interval of field 2 and has an active clock edge occurring halfway through line 263 of each frame, at about $t_1+nH+16,730.16$ μs. The switch point of field 1 therefore occurs halfway through line 1 and the switch point of field 2 occurs halfway through the first complete line of field 2. It will be appreciated that the interval between the switch points for field 1 and field 2 is not equal to half the frame interval and therefore the 60 Hz clock cannot be used alone to time both switch points.

Similarly, the two signals HDCLK1 and HDCLK2 each have a frequency of 30 Hz but they are offset in time. The signal HDCLK1 is used to update the crosspoints of the router 22 during the blanking interval of field 1 and has an active clock edge occurring halfway through line 1 of each frame, at about $t_1+nH+24.75$ μs, and the signal HDCLK2 is used to update the crosspoints during the blanking interval of field 2 and has an active clock edge occurring halfway through line 563 of each frame, at about $t_1+nH+16,716.17$ μs. The switch point of field 1 therefore occurs halfway through line 1 and the switch point of field 2 occurs halfway through the first complete line of field 2.

It will therefore be seen that the two routers are operated without explicit regard to time relative to the lines of the respective video signals but by establishing a time reference point and measuring lapse of time after the reference point.

Figure 2:
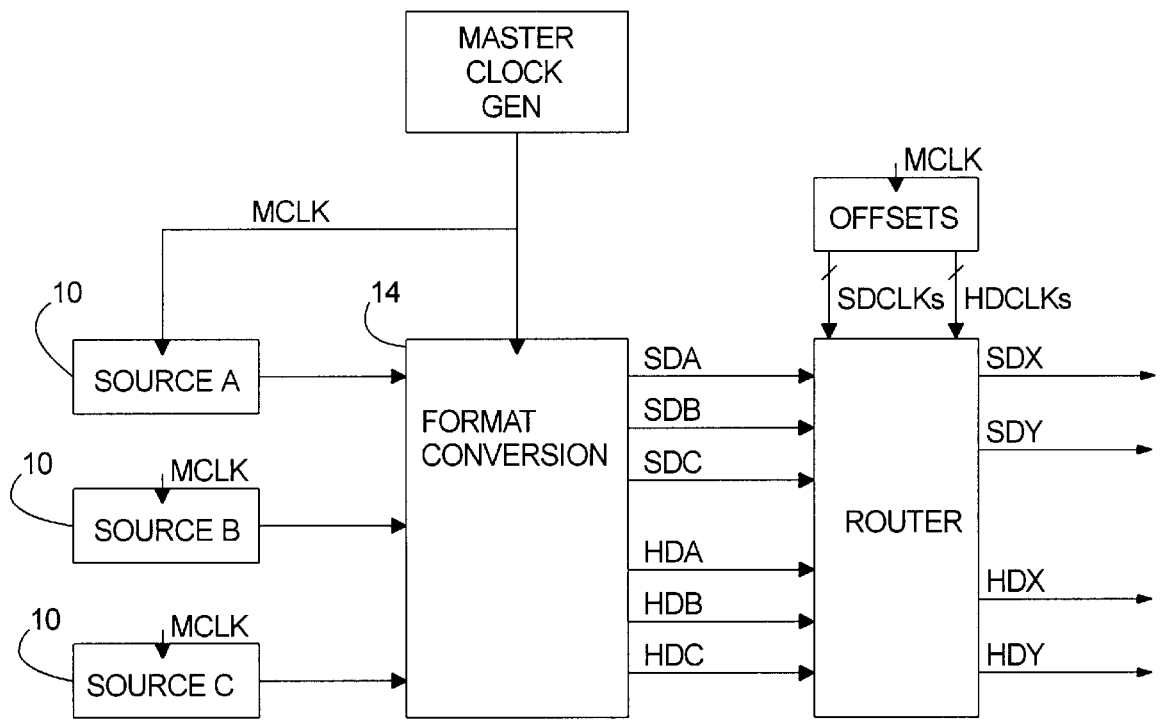
FIG. 2 is a simplified block diagram of a second television broadcast facility in accordance with the present invention.

The foregoing description of FIG. 1 has been based for convenience on the assumption that all the crosspoints of each router are updated simultaneously. However, routers are available in which the crosspoints on a given input bus can be updated at a different time from the crosspoints on a different input bus. Such a router can be used for both the HD signals and the SD signals. FIG. 2 shows such an arrangement. The SDCLK signals are used for updating the crosspoints on the router input buses that receive the SD signals and correspondingly the HDCLK signals are used for updating the crosspoints on the router input buses that receive the HD signals.

Figure 3:
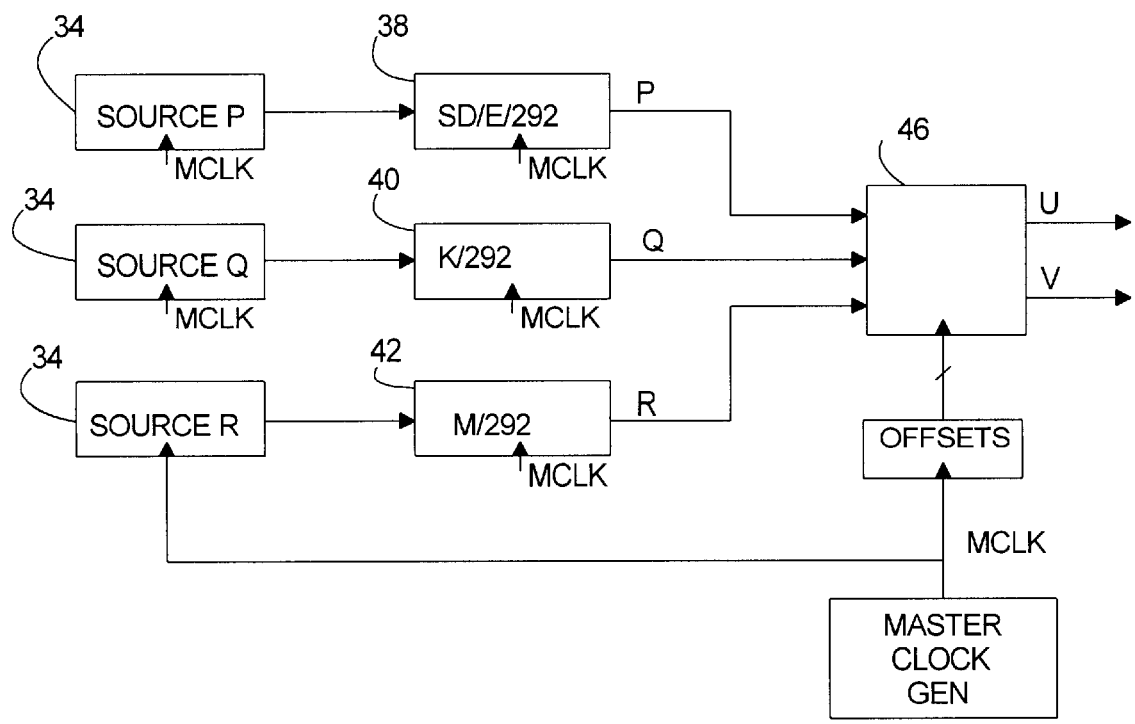
FIG. 3 is a simplified block diagram of a television post production facility in accordance with the present invention.

FIG. 3 illustrates schematically a post production facility having three video sources 34, more specifically designated Source P, Source Q and Source R which supply video signals in, respectively, NTSC, SMPTE format K and SMPTE format M. The three video signals are supplied to format converters 38, 40 and 42 respectively. The converter 38 converts the NTSC signal to SMPTE format E and converts format E to SMPTE 292. The converter 40 converts SMPTE format K to SMPTE 292 and the converter 42 converts SMPTE format M to SMPTE 292.

The three sources 34 operate under control of a master clock generator 50, which generates a master clock MCLK at 60 Hz. The master clock signal is used directly to control Source P and Source R. A clock signal at 24 Hz is generated from the master clock signal by integer multiplication and division and is used to control Source Q. Since the same clock signal is used to control all three sources, it is straightforward to align line 1, field 1, frame 1 of the three sources at a reference time $t_0$.

The master clock signal is also used to control the format converters, so that the output signals of the format converters are aligned at time $t_1$, where $t_1-t_0$ represents delay from the outputs of the sources 34 to the outputs of the format converters.

The three SMPTE 292 signals P, Q and R are supplied to a router 46, which selects among the three signals P, Q and R to generate output signals U and V. The switch points for the router 46 are determined based on lapse of time from the reference time $t_1$. The first active edge of the master clock signal MCLK coincides with the start of line 1, field 1, frame 1 of the three signals P, Q and R.

The switch points for the interlaced format of signal P (format E) are halfway through line 1 and halfway through the first complete line of field 2. The field 1 switch points of format E are at $t_1+(2n-2) * H+14.81$ μs, where H is the period of the master clock signal and n is the frame number, and the field 2 switch points of format E are at $t_1+(2n-1) * H+29.64$ μs. Over a five frame sequence, the frame 1 switch point of signal Q, which is based on the progressive scan format K, is at $t_1+18.52$ μs, the frame 2 switch point is at $t_1+2H+8351.85$ μs, the frame 3 switch point is at $t_1+5H$, the frame 4 switch point is at $t_1+7H+8351.85$ μs, and the frame 5 switch point is at $t_1+10H$. The frame n switch point of signal R, which is based on the progressive scan format M, is $t_1+(n-1) * H+11.11$ μs.

It can be seen from the foregoing that the time offsets of the switch points of the several formats are offset from the active clock edges of the master clock signal MCLK in a predictable and repeating fashion. It will be appreciated that similar considerations apply to a 25 Hz frame rate.

It has been assumed in the foregoing discussion that the value of M is one, not 1.001. Since each of the signal formats mentioned in the foregoing discussion has a frame rate that is not an integer number of frames per second but an integer divided by M frames per second, the time offsets mentioned above would have to be multiplied by M.

Further, although for the sake of simplicity the invention has been described with reference to controlling the router so that the switch line is the first line of the vertical blanking interval of each field, the switch line could equally well be another line of the vertical blanking interval. It is necessary only that the several formats be aligned so that at an arbitrary time $t_{ref}$ the beginning of a given line of each format is aligned in time with the beginning of a line of each other format. When this is achieved, the switch points can be controlled by measuring lapse of time from the time $t_{ref}$, without regard to line count.

It will be appreciated that the invention is not restricted to the particular embodiment that has been described, and that variations may be made therein without departing from the scope of the invention as defined in the appended claims and equivalents thereof.

What is claimed is:

1. A method of operating a video router in a plant including at least first and second video sources which provide first and second digital video signals respectively at integer related frame rates, said method including:

(a) operating the first and second video sources so that the first and second video signals are aligned at a reference time, (b) measuring lapse of time from said reference time, and (c) updating the router at switch points specified by reference to lapse of time measured in step (b) and without regard to line count of the video signals.

2. A method according to claim 1, further comprising converting the first and second digital video signals to a common digital interface format.

3. A method according to claim 1, wherein the first and second digital video signals are high definition video signals and the plant also includes a third video source which provides a standard definition video signal under control of a master clock signal, and wherein the master clock signal is used to control the first and second video sources and to measure lapse of time.

4. A method according to claim 1, comprising generating a master clock signal at a frequency that is equal to, or an integer multiple of, the frame rate of the first digital video signal, and measuring lapse of time by reference to the master clock signal and periodically applied time offsets.

5. A method according to claim 1, wherein each of the first and second video signals has a frame rate of 24/M, 25/M, 30/M or 60/M, where M is equal to 1 second or 1.001 second, and the method comprises generating a master clock signal at a frequency of 60/M, and measuring lapse of time by reference to the master clock signal.

6. A method according to claim 5, wherein step (a) comprises employing the master clock signal to control the first and second video sources.

7. A method according to claim 1, wherein the first and second digital video signals are of equal frame period and step (c) comprises updating the router at times $nH+t_{os}$ relative to the reference time, where n is an integer, H is the frame period and $t_{os}$ is a time offset.

8. A method according to claim 1, wherein the first and second video signals are of equal frame period and of interlaced format and step (c) comprises updating the router at times $nH+t_{os1}$ and $nH+t_{os2}$, where n is an integer, H is the frame period and $t_{os1}$ and $t_{os2}$ are time offsets.

9. A video production plant including:

at least first and second video sources which provide first and second digital video signals respectively at integer related frame rates, the first and second video sources being aligned at a reference time, a router means for combining the first and second video signals to generate an output video signal, a time measurement means for measuring lapse of time from the reference time and defining switch points, an update means responsive to the time measurement means for updating the router means at preselected times relative to the reference time without regard to line count of the video signals.

10. A video production plant according to claim 9, further comprising converting the first and second digital video signals to a common digital interface format.

11. A video production plant according to claim 9, wherein the first and second video sources provide the first and second digital video signals in high definition format, the plant also includes a master clock generator which generates a master clock signal and a third video source which provides a standard definition video signal under control of the master clock signal, and the master clock signal controls the first and second video sources and is provided to the time measurement means for measuring lapse of time.

12. A video production plant according to claim 9, comprising a master clock generator for generating a master clock signal at a frequency that is equal to, or an integer multiple of, the frame rate of the first digital video signal, and wherein the time measurement means measures lapse of time by reference to the master clock signal and periodically applied time offsets.

13. A video production plant according to claim 9, wherein each of the first and second video sources generates a video signal having a frame rate of 24/M, 25/M, 30/M or 60/M, where M is equal to 1 second or 1.001 second, the plant also includes a master clock generator which generates a master clock signal at a frequency of 60/M, and the time measurement means measures lapse of time by reference to the master clock signal.

14. A video production plant according to claim 13, wherein the master clock signal is provided to the first and second video sources to control generation of the first and second video signals.

15. A video production plant according to claim 9, wherein the first and second digital video signals provided by the first and second video sources are of equal frame period and the update means updates the router at times $nH+t_{os}$ relative to the reference time, where n is an integer, H is the frame period and $t_{os}$ is a time offset.

16. A video production plant according to claim 15, wherein the first and second video signals provided by the first and second video sources are of equal frame period and of interlaced format and the update means updates the router at times $nH+t_{os1}$ and $nH+t_{os2}$, where n is an integer, H is the frame period and $t_{os1}$ and $t_{os2}$ are time offsets.

* * * * *